United States Patent [19]

Klein

[11] Patent Number: 4,717,100
[45] Date of Patent: Jan. 5, 1988

[54] FASTENER ASSEMBLY

[75] Inventor: Jean-Luc R. G. Klein, Bouxwiller, France

[73] Assignee: TRW Carr France S.A., Ingwiller, France

[21] Appl. No.: 884,393

[22] Filed: Jul. 11, 1986

[51] Int. Cl.$^4$ ................................................ F16L 3/08
[52] U.S. Cl. ........................................ 248/73; 248/74.1
[58] Field of Search ................. 248/73, 68.1, 74.1, 248/74.2, 74.5, 507, 500; 411/432, 437, 436, 422, 427, 533, 970, 372

[56] References Cited

U.S. PATENT DOCUMENTS

| | | | |
|---|---|---|---|
| 3,579,942 | 5/1971 | Cole | 411/970 X |
| 3,782,437 | 1/1974 | Seckerson | 411/970 X |
| 3,944,176 | 3/1976 | Danko | 248/73 X |
| 4,114,506 | 9/1978 | Aimar | 411/970 X |
| 4,358,080 | 11/1982 | Wolker | 248/68.1 |
| 4,467,988 | 8/1984 | Kraus | 248/68.1 |
| 4,541,602 | 9/1985 | Potzas | 248/68.1 X |
| 4,550,891 | 11/1985 | Schaty | 248/68.1 |

FOREIGN PATENT DOCUMENTS

| | | | |
|---|---|---|---|
| 1297663 | 11/1972 | United Kingdom | 248/73 |
| 1296677 | 11/1972 | United Kingdom | 248/73 |

Primary Examiner—J. Franklin Foss
Attorney, Agent, or Firm—Fay, Sharpe, Beall, Fagan, Minnich & McKee

[57] ABSTRACT

A fastener assembly useful for securing cables, wiring, tubing and similar components to screw-threaded pins or studs. The disclosed assembly includes a securing element having a base part formed with a cylindrical aperture adapted to receive an associated bearing or connecting part. The bearing part includes means allowing it to be axially pressed onto the threaded pin or stud to retain the securing element thereon. A resilient tongue is carried on the bearing part and functions to permit relative rotation between the base part and the bearing part while preventing axial movement. The bearing part can thus be selectively rotated to release both it and the securing element from the threaded pin.

9 Claims, 3 Drawing Figures

FASTENER ASSEMBLY

BACKGROUND OF THE INVENTION

The subject invention relates to a fastening assembly including a securing element having a base part formed with a cylindrical aperture adapted to receive a bearing part pressable on to a screw-threaded pin or stud to retain the securing element thereon.

An example of the prior art is a securing assembly devised as a cable clamp. The bearing part is adapted to be knocked into a cylindrical aperture in the base part. Ribs in a blind bore in the bearing part are adapted to engage with the screw threads of a screw-threaded pin or stud carried on an associated support member. The securing assembly is therefore reliably secured to the screw-threaded pin by the bearing part being driven onto the pin.

A disadvantage of this known construction is that the complete unit must be destroyed to demount the securing assembly, non-destructive demounting being impossible. Demounting is also very difficult and tedious since considerable force is required to release the bearing part from the screw-threaded pin.

It is the object of this invention to develop a construction of the kind hereinbefore set out such that the securing assembly can be demounted satisfactorily without the various components being destroyed.

BRIEF SUMMARY OF THE INVENTION

According to the invention, the bearing part is received in the cylindrical aperture in the base part so as to be rotatable but axially immobile. Since the bearing part can be rotated in the base part, the bearing part can be selectively turned to produce unthreading and a gradual release of the bearing part and, therefore, of the complete securing element from the screw threads of the pin. Since the bearing part is axially immobile in the securing element, the complete securing assembly is therefore gradually released from the threaded pin.

According to another feature of the invention, the means for producing axial immobility comprises at least one resilient tongue engageable between the bearing part and the securing element. When the bearing part has been positioned in the base part, the tongue is arranged to engage an abutment to prevent relative axial movement. This feature, by simple means and without substantial alteration of the complete construction, helps to facilitate demounting.

According to a further feature of the invention, the securing assembly can be a cable clamp having two cable-retaining zones in the base part. The cylindrical aperture and the bearing part are preferably disposed between the cable-retaining zones. The abutment is desirably a collar which is disposed around the bearing part between the two cable-retaining zones and has an abutment surface facing toward the screw-threaded pin. The bearing part preferably also has three ribs whose axes are parallel to one another and which are guided in an additional cylindrical aperture in the base part. Consequently, even a known cable clamp can in a simple manner have its demountability improved and rendered non-destructive.

According to another feature of the invention, the collar and the additional cylindrical aperture can be disposed in a web interconnecting the two cableretaining zones in the base part. In this case, the axis of the resilient tongue can extend parallel to the axes of the ribs and can include an entry bevel.

BRIEF DESCRIPTION OF THE DRAWINGS

The above and other objects and advantages of the invention will become apparent from the following description when read in conjunction with the accompanying drawings wherein.

DESCRIPTION OF A PREFERRED EMBODIMENT

Figure 1:
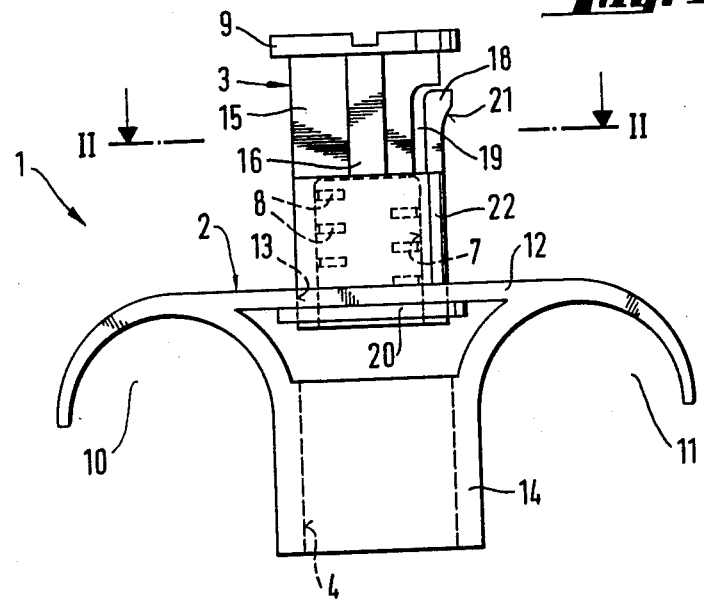
FIG. 1 is a diagrammatic side view of the fastener assembly before being attached to a threaded pin.
Figure 3:
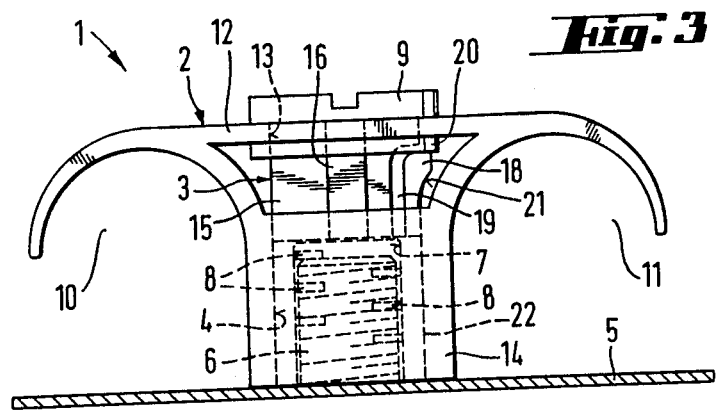
FIG. 3 is a side view showing the fastener assembly attached to a threaded pin.

Referring more particularly to the drawings wherein the showings are for the purpose of illustrating a preferred embodiment of the invention only and not for the purpose of limiting same, FIGS. 1 and 3 show a molded plastic fastener assembly 1 generally comprising a securing element or base part 2 and a bearing or connecting part 3. The base part 2 is formed with a cylindrical aperture 4 adapted to have the outer periphery of the part 3 received therein. To this end, the bearing part 3 comprises a cylindrical member 22 whose outer diameter is sized to be closely but freely received in the inner diameter of the aperture 4. Extending axially inward from the lower end of member 22 is a blind bore or opening 7 having a diameter greater than the diameter of the threaded pin 6 (see FIG. 3) to which the assembly is to be connected. A plurality of resilient ribs 8 extend radially inward in a known manner from the wall of opening 7 for engagement between the threads of pin 6.

As shown in FIG. 1, the part 3 can be disposed before final fitting or assembly in an additional cylindrical aperture 13 in the base part 2. Another possibility (not shown) is to temporarily secure the bearing part 3 to the base part 2 before final fitting by a sprayed or skin or film.

The base part 2 is shown as having two semicylindrical cable-retaining zones 10, 11 which are joined on opposite sides of a main rectangular body 14 of the base part 2. The body 14 is formed with the previously mentioned aperture 4. A web 12 interconnects the two zones 10, 11. As illustrated, web 12 is formed with the additional cylindrical aperture 13 in which the bearing part 3 is slidably engaged. A collar 20 is carried on the underside of the web 12 and extends around the bearing part 3.

Figure 2:
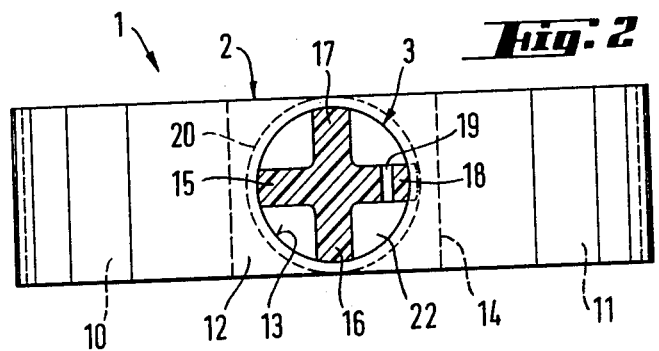
FIG. 2 is a cross-sectional view taken on the line II—II of FIG. 1.

The bearing part 3 comprises in its bottom region a cylindrical member 22 which is contiguous in its top part with three ribs 15, 16 and 17 (see FIG. 2) disposed at right-angles to one another. The outer, vertically extending surfaces of the ribs 15, 16, and 17 form a continuation of the outer surface of member 22. Opposite the rib 15 is a resilient tongue 18 arising as a result of a slot 19 in this part of the rib 15. The upper portion of tongue 18 normally extends laterally to a position beyond the surface of member 22. The underside of the upper portion of tongue 18 is preferably provided with an entry bevel 21 for purposes subsequently to be described.

FIG. 3 shows a support member 5 such as part of the bodywork of a motor vehicle. A screw-threaded pin 6 is secured to the support member 5. To assemble the fastener assembly 1 to the pin 6, the components, in their initial position shown in FIG. 1, are placed on the pin 6. Thereafter, the head 9 of bearing part 3 is given a firm tap to force the part 3 axially into the aperture 4 in the rectangular member 14 of the base part 2. The ribs 8 in the blind bore 7 in the cylindrical member 2 engage the corresponding screw threading of the pin 6. As the bearing part 3 is driven in, the outer peripheries of the ribs 15, 16 and 17 slide axially in the additional cylindrical aperture 13. The tongue 18 deflects radially inward by virtue of surface 21 until it passes through opening 13. Thereafter, it springs back out and engages behind the collar 20. Consequently, the tongue 18 now bears on the end face of the collar 20 of the web 12. This prevents axial withdrawal of bearing part 3 from base part 2. Relative rotation of the two parts is, however, still possible.

Consequently, an assembled position such as shown in FIG. 3 now exists. The blind bore 7 in the bearing part 3 engages around the pin 6 with the ribs 8 engaging between the discrete convolutions of the threads of the pin 6 to thus retain the securing element assembly 1 to the pin 6. The bearing-part head 9 bears on the web 12 to provide a reliable securing of the whole assembly to the support member 5. Previously, appropriate cables have been placed in the zones 10, 11 so that the element 1 retains the cables satisfactorily on the support member 5. To remove the cables or detach the element 1 from the support member 5, a tool such as a screwdriver can be engaged in a slot 24 in the top of the bearing part 3 to rotate the same around its own axis. During such rotation, the tongue 18 slides on the end face of the collar 20 as the bearing part 3 turns in the aperture 4 and the additional aperture 13. Rotation of the part 3 leads gradually to the release from the screw threading of the pin 6. Consequently, the complete assembly 1 can be gradually and non-destructively unscrewed from the pin 6.

The invention provides a fastener assembly, especially useful as a cable clamp, which can be assembled very rapidly and very effectively and thereafter released readily and completely non-destructively from the screw-threaded pin by being turned. This is made possible by the resilient tongue 18 which bears on the end face of the collar 20. The same extends around the bearing part 3 so that the same can be turned in the apertures 4, 13 in the base part 2 without any axial movement occurring between the same and the bearing part 3.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In a fastener assembly including a securing element having a base part formed with a first axially elongated cylindrical aperture extending therethrough and receiving a generally cylindrical bearing part having a central axially extending opening pressable in an axial direction on to a screw-threaded stud to retain the securing element thereon, the improvement wherein means are provided for retaining the bearing part in the aperture in the base part in a manner to prevent relative axial movement between the base part and the bearing part while permitting rotation of the bearing part in the base part, said means including an abutment and at least one resilient tongue member adapted to engage with said abutment when said bearing part is received in said first cylindrical opening, said abutment and said tongue each positioned to be entirely within said base part when said bearing part is retained therein.

2. A fastener assembly according to claim 1 wherein said abutment is defined by a collar which, when the bearing part is received in the base part, extends around the bearing part.

3. A fastener assembly accordingn to claim 2 wherein the base part includes two cable-retaining means, the bearing part being received between said two cable-retaining means.

4. A fastener assembly according to claim 3 including a web interconnecting the two cable-retaining means in the base part, and wherein said collar is carried by said web.

5. A fastener assembly according to claim 3 wherein said base part includes a web provided with a second aperture for guiding the bearing part into said first aperture.

6. A fastener according to claim 1 wherein the bearing part includes a plurality of axially extending ribs.

7. A fastener assembly according to claim 1 wherein said tongue member extends axially.

8. A fastener assembly according to claim 7 wherein said tongue member is carried on said bearing part.

9. A fastener assembly according to claim 8 wherein said tongue member is deflectible in a direction radially of said aperture.

* * * * *